Dec. 11, 1934.   M. A. CHEEK   1,983,967
METHOD AND APPARATUS FOR PRODUCING RUBBER
Filed Dec. 31, 1931    4 Sheets-Sheet 2
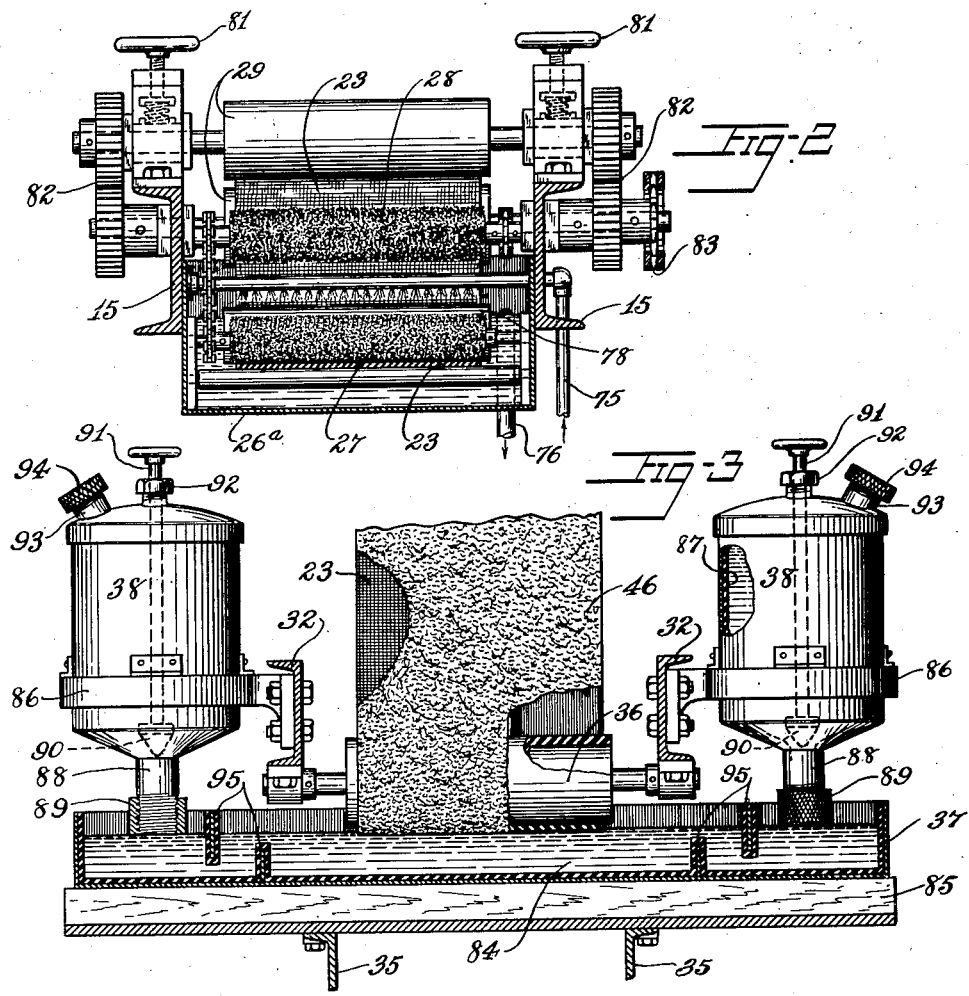
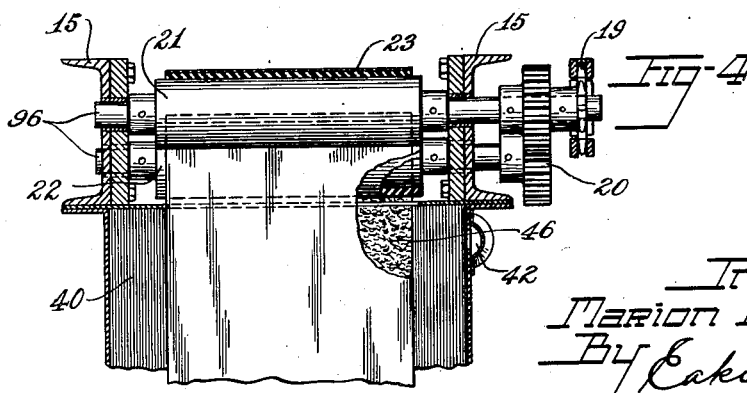
Inventor
Marion A. Cheek
By Eakin & Avery
Attys Dec. 11, 1934.                M. A. CHEEK                    1,983,967
                METHOD AND APPARATUS FOR PRODUCING RUBBER
                Filed Dec. 31, 1931        4 Sheets-Sheet 3
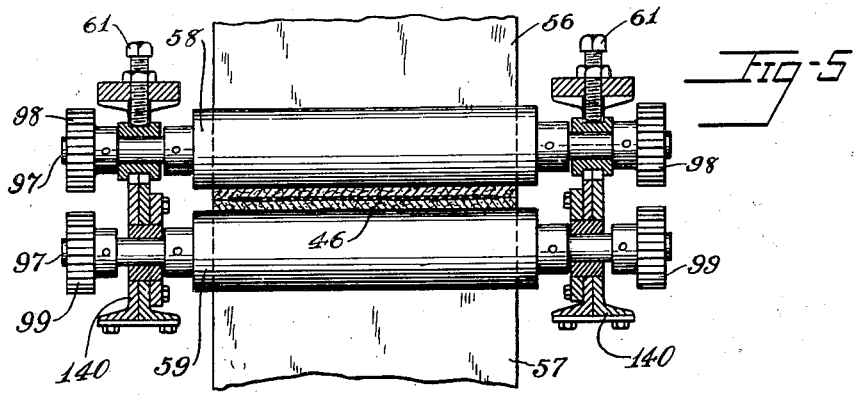
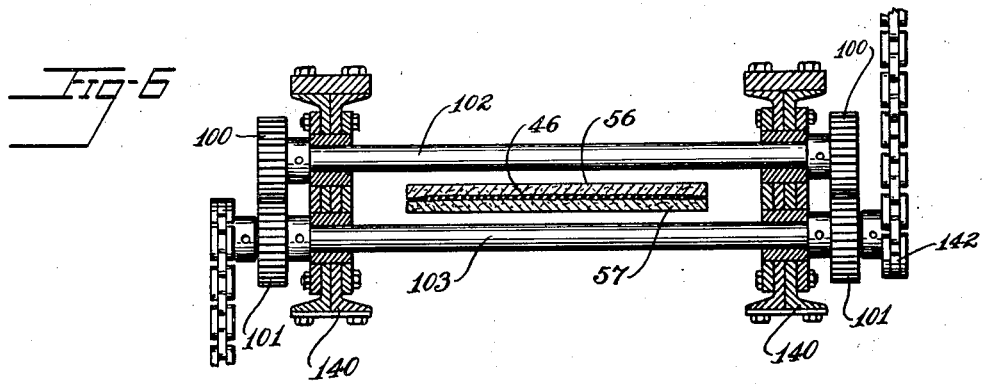
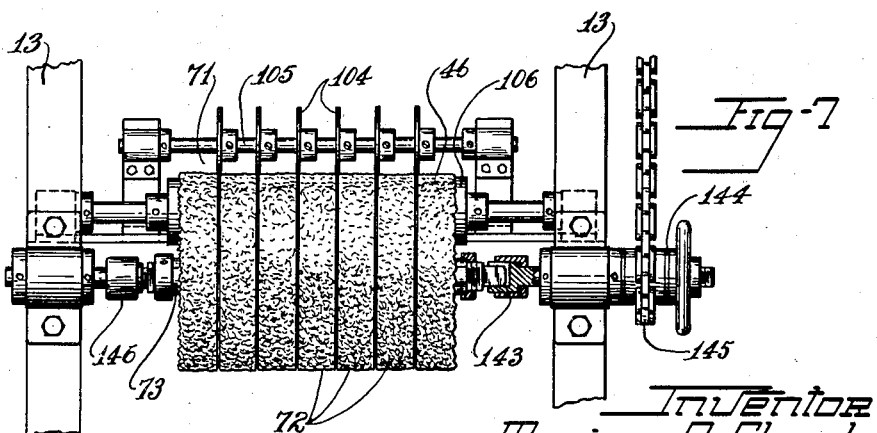

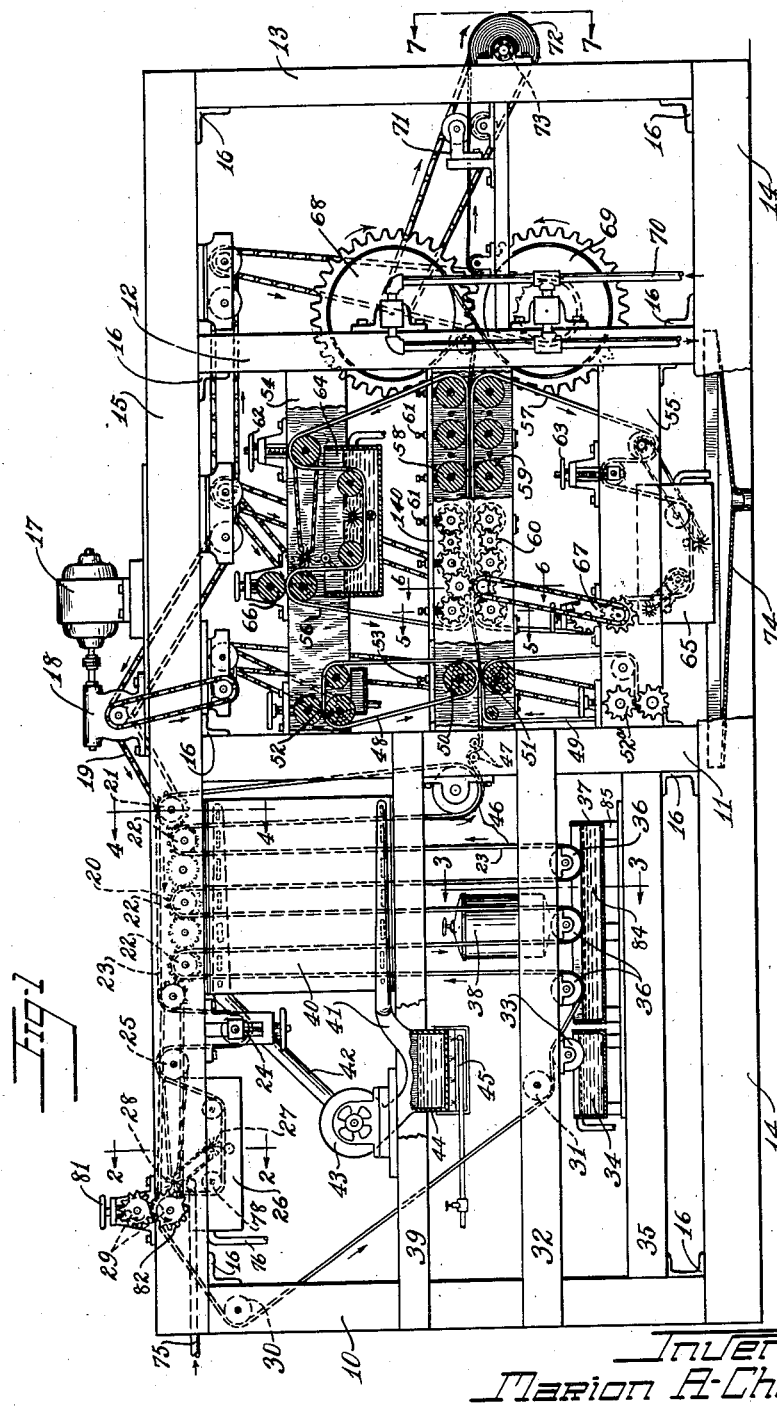

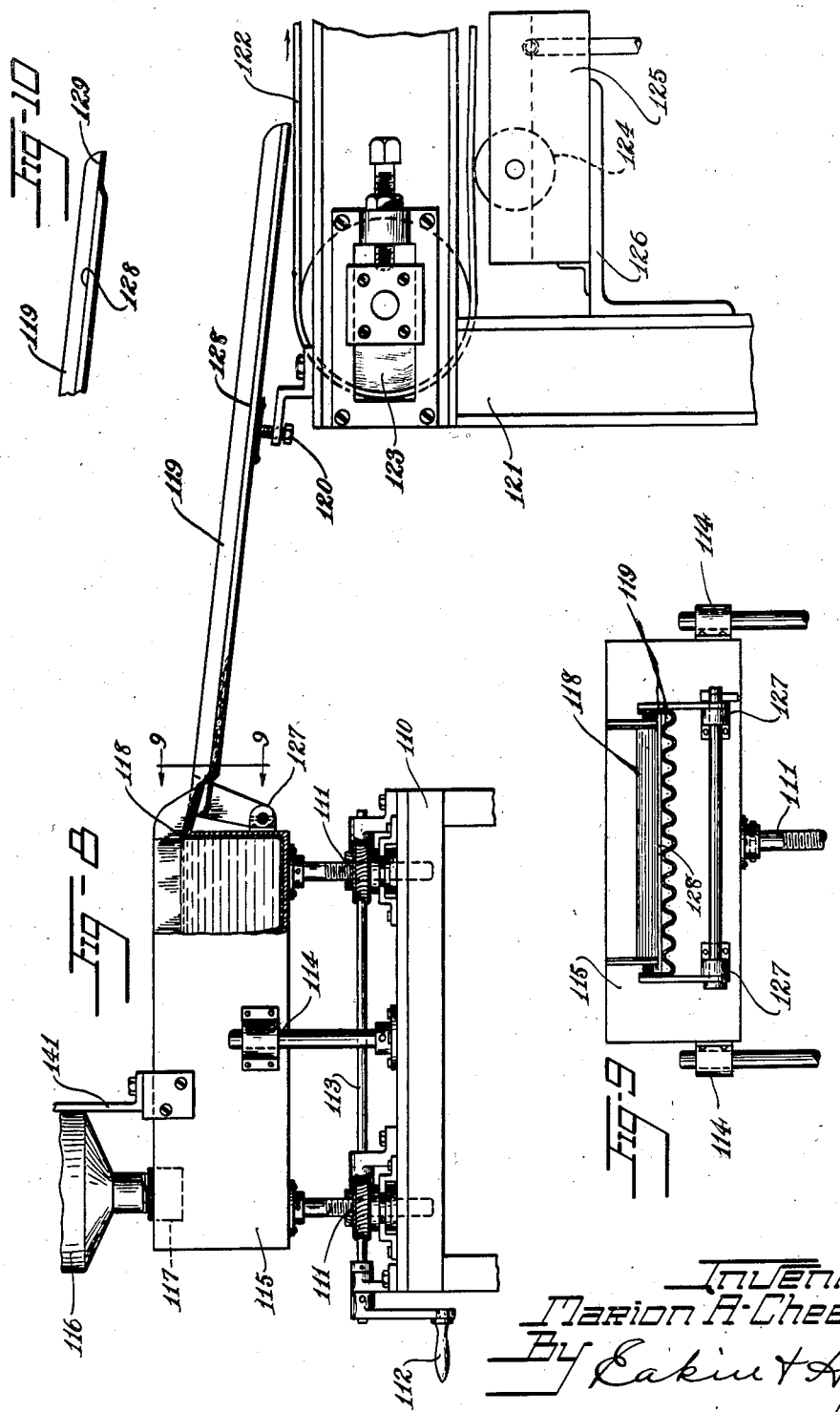

Patented Dec. 11, 1934

1,983,967

UNITED STATES PATENT OFFICE 1,983,967

METHOD AND APPARATUS FOR PRODUCING RUBBER

Marion A. Cheek, Akron, Ohio, assignor to The B. F. Goodrich Company, New York, N. Y., a corporation of New York Application December 31, 1931, Serial No. 584,054

15 Claims. (Cl. 18—2)

This invention relates to the production of crude rubber from natural rubber latices and more particularly to a method and apparatus for such production of rubber requiring no mechanical working of the rubber during its production and no sudden change in the physical or chemical condition of the rubber constituents during such transition of the rubber from the aqueous suspension of the latex to the solid mass of the crude rubber of commerce.

Crude rubber is supplied to the market in three principal forms, namely, so-called wild rubbers generally in the form of "biscuits", plantation rubbers including the several varieties and types of crepes and sheets, and spray dried rubbers, all of which exhibit certain deficiencies when employed in the manufacture of vulcanized rubber goods. Of these, the wild rubbers are no longer of any great commercial importance, having been displaced largely by plantation rubbers, and need not be here considered further. Crepes and sheets in their several types constitute the bulk of rubber now used commercially, but they are not entirely satisfactory because of the variations in the quality and properties of the rubber as it appears on the market, resulting from the inherently intermittent method of manufacture now practiced on the plantations. Spray dried rubber because of its peculiar method of manufacture, namely, suddenly subjecting the rubber to elevated temperatures while in a finely divided sprayed form, exhibits certain undesirable physical properties in that it is very tough, horny, and difficult to work, and requires an unusual amount of preliminary mastication before it may be successfully incorporated in a rubber composition.

The object of the present invention, therefore, is to provide a method and apparatus for continuously and rapidly preparing from latex a crude rubber which will not present the variations in quality and properties common in sheets and crepes, and will not possess the undesirable physical qualities of spray dried rubber, but will be uniform in quality, readily workable, and will also have new and valuable properties peculiar to itself.

The several steps and units comprising the method and apparatus herein presently to be described cooperate to accomplish the purpose of this invention by setting up a specific syneresis of the rubber particles of the latex. This syneresis is effected by the application to the rubber particles of a succession of means comprising the treatment of a previously formed latex sheet with a rubber coagulant, thus instituting the syneresis by chemical or electronic means involving the neutralization of the negative electric charges on the rubber particles of the latex, which electric charges are initially inhibitors of syneresis effects, the furtherance of the syneresis of the rubber particles by the assistance of mechanical means effecting a gradual and progressive densification of the rubber particles preferably in sheet form, accompanied by a shrinkage of the sheet and an expression of water therefrom, and the continuance of the syneresis by the application to the compacted sheet of heat of such intensity and for such time as substantially to complete the syneresis of the rubber particles and the expression of moisture therefrom.

In the course of the transition from latex to solid rubber, the syneresis effects a knitting together and interlocking of the particles of the latex in a structure which is different from that of prior rubbers and imparts to the new rubber properties peculiar to it and of great commercial value.

The invention in a preferred embodiment comprises the method of, and the apparatus for, continuously building up on a moving surface a relatively thin sheet of rubber latex, coagulating the latex to form a continuous sheet of wet coagulum, removing the wet sheet from the moving surface and subjecting said sheet to a novel continuous compacting and heating treatment and finally arranging the dried sheet in a form suitable for packing and shipping.

The invention will be described with reference to the accompanying drawings, in which Fig. 1 is a side elevation partly in section of a preferred form of the apparatus of the invention.

Fig. 2 is a vertical section on line 2—2 of Fig. 1.

Fig. 3 is a vertical section on line 3—3 of Fig. 1.

Fig. 4 is a vertical section on line 4—4 of Fig. 1.

Fig. 5 is a vertical section on line 5—5 of Fig. 1.

Fig. 6 is a vertical section on line 6—6 of Fig. 1.

Fig. 7 is an end view of a part of the apparatus of Fig. 1 as indicated by line 7—7.

Fig. 8 is a side elevation, partly in section, of an alternative apparatus for forming a thin sheet of coagulated rubber.

Fig. 9 is a vertical section on line 9—9 of Fig. 8.

Fig. 10 is a sectional side elevation of a modified form of a part of the apparatus of Fig. 8.

The apparatus (Fig. 1) comprises a frame of structural steel composed of two similar side assemblies formed by parallel upright supporting members 10, 11, 12 and 13, connected at their bottoms by horizontal cross members 14, and at their tops by similar cross members 15. The two side assemblies are connected and bound together by cross members 16 at the several junctures of the upright supporting members and the horizontal members, to form a rigid rectangular frame structure.

Centrally located on top of said frame structure is supported a motor 17 directly connected to a gear reduction unit 18 which drives by means of sprocket and chain 19, a gear train 20 which causes rotation of rollers 21 and 22 supported between upper cross members 15 and over which passes an endless deposition belt 23, which is preferably rubber covered with a somewhat roughened surface.

Propelled by rollers 21 and 22, the belt 23 passes under a belt tightener 24, suspended from members 15, and then over guide roll 25 into a cleaning or scrubbing device 26 through which a continuous flow of water or other cleaning liquid may be maintained. While submerged in the cleaning liquid in the scrubber 26, the upper surface of the belt is scrubbed by a revolving brush 27, and after emerging from the bath, is further scrubbed by a similar revolving brush 28 and then passes between rotating wringer rolls 29 which express the excess liquid from the belt.

The deposition belt passes over guide roll 30 rotatably supported near the upper end of members 10 and thence downward past roll 31 rotatably supported by frame members 32 between uprights 10 and 11, and contacts with a transfer roll 33 supported by member 32 at the right of and below roll 31. The lower portion of transfer roll 33 is immersed in a bath 34 of rubber latex coagulant, supported by cross members 35 between uprights 10 and 11 and below cross members 32, and receives from said bath a coating of rubber coagulant which it in turn transfers to the surface of belt 23.

The belt 23 then passes a series of lower guide rolls 36 rotatably mounted on cross members 32, and upper guide rolls 22, which upper and lower guide rolls are relatively disposed so as to cause the belt to form in its travel a series of vertical loops or festoons. At the bottom of each loop, as determined by the lower peripheries of guide rolls 36, the belt with its adherent coating of coagulant contacts with rubber latex maintained at a constant liquid level in tank 37 mounted on cross members 35, said constant level being maintained by controlled flow of latex from supply tanks 38 mounted on cross members 32, and above the tank 37.

Supported on cross members 39 between uprights 10 and 11 is provided a conditioning chamber 40 arranged to inclose the upper portions of the several loops formed by the deposition belt in its travel. Through said conditioning chamber may be circulated conditioning vapors which may be the vapors of a liquid rubber coagulant or other conditioning vapor, by means of a circulatory system supported on cross members 39 and comprising the chamber 40, connecting ducts 41 and 42 and a motor driven blower 43. The duct 41 passes over and connects with a tank 44 capable of containing a liquid and being heated by some convenient means such as gas burners 45, so regulated as to evaporate sufficient liquid to supply the vapor circulating system with conditioning vapors therefrom.

The foregoing treatments cause a thin film of rubber coagulum 46 to be continuously deposited on the surface of the belt 23, which rubber film is subsequently removed from the belt by rolls 47 rotatably mounted between uprights 11, and the belt 23 returned to repeat the cycle as described.

The freshly formed wet rubber film or sheet is next subjected to a gradual compacting and drying treatment, the sheet passing from guide rolls 47 to a wringing or squeezing device which serves to preliminarily compact the sheet and express a part of its water content and which comprises two similar moving endless belts 48 and 49 which while carrying the rubber sheet between their contiguous surfaces, pass the closely relationed peripheries of upper and lower rotatably driven pressure rolls 50 and 51 mounted on central cross supporting members 140 between uprights 11 and 12. An adjusting device 53 is provided to regulate the clearance between rolls 50 and 51 and so control the pressure applied through the belts to the rubber sheet. From the pressure rolls, the belts 48 and 49 pass through similar upper and lower wringers 52 and 52ª which remove from the belts a large part of the water received by them from the rubber sheet and which are supported respectively by upper cross frame members 54 and lower cross members 55 between uprights 11 and 12.

The compacted rubber sheet passes from the wringer and is next subjected to pressure while moving supported between upper and lower endless belts 56 and 57 which belts are preferably made of absorptive materials such as, or similar to felt, and which receive pressure from and pass between a series of upper and lower pressure rolls 58 and 59 rotatably mounted between central cross members 140 and driven by a gear train 60, the units of which are so arranged and disposed as to allow considerable relative vertical movement of the rolls without disengaging the several driving gears, thus allowing adjustment of the roll clearance as regulated by devices 61 and control of the pressure applied through the absorptive belts to the rubber sheet.

Thus, as the wet rubber sheet passes the series of rollers 58 and 59, it is subjected to considerable pressing and kneading while in contact with the highly absorptive belts, which treatment serves to effectually remove a substantial part of the water from the wet rubber and compact it into a relatively dense sheet.

Upper and lower belt tighteners 62 and 63, washing machines or scrubbers 64 and 65 and wringers 66 and 67 all similar to those previously described in connection with the deposition belt are provided respectively on cross members 54 and 55 to clean the water absorbing belts, and express the excess liquid received by them from the rubber, and return the belts to repeat the absorptive drying process.

The now partially dried and well compacted rubber sheet passes around and contacts with the peripheries of two or, if desired, more circular drums 68 and 69, mounted one above the other on upright frame members 12 and heated internally by steam or other means supplied by a pipe system 70, which serves to completely dry the rubber sheet.

The completely dried thin sheet is directed from the heated drums through a device 71 for longitudinally slitting the sheet into a plurality of continuous strips which strips are subsequently wound into a plurality of discs 72 on rotating spindle 73, mounted on upright members 13.

It is obvious that other means for consolidating the finished sheet of rubber for packing may readily be substituted for the windup described.

The several moving parts comprising the apparatus, with the exception of the separately driven blower 43, are all actuated by the motor 17 by means of a suitable system of connecting sprockets and chains and gears, arranged to produce the desired motion of any particular part of the machine, and these various parts are so speeded and synchronized as to allow a film of rubber latex to form on the deposition belt 23 and to cause the film or sheet after removal from the belt 23 to progress steadily through the apparatus, and preferably to maintain the sheet, after leaving wringer rolls 50 and 51, under slight but distinct tension throughout the subsequent drying and winding operations.

A drip pan 74 is provided between uprights 11 and 12 near the bottom of the machine to receive the waste liquid from the several wringers and scrubbers, etc.

In Fig. 2 are shown details of one of the belt scrubbers and wringers mounted on frame members 15 and comprising a tank 26a through which may be maintained a continuous flow of liquid entering through pipe spray 75 and leaving through a drain 76. The deposition belt is immersed in the liquid and while immersed is scrubbed by a revolving brush 27, and after passing guide roll 78 and emerging from the liquid, is further scrubbed by a similar revolving brush 28 from which the belt passes upward and between wringer rolls 29 where sufficient pressure, regulated by adjusting devices 81 is applied to the belt to remove the excess liquid from the belt. The brushes and rolls are actuated by means of a suitable system of gears 82 and sprocket and chain 83.

In Fig. 3 the deposition belt 23 with its previously applied coating of coagulant, passes under roll 36 and contacts with the latex 84 contained in the rubber lined tank 37, receives therefrom a coating 46 of the latex, and then moves upward. The tank 37 is supported on cross frame members 35 and interposed members 85.

The latex is supplied to the tank 37 from supply tanks 38 supported by means of brackets 86 associated with frame members 32.

The closed cylindrical tanks 38 are similarly constructed, preferably of metal with rubber linings 87 to reduce coagulation of the latex in the tanks, and have conically depressed bottoms fitted with outlets 88 having at their lower extremities, threaded sleeves 89. Conical plugs or closures 90 adapted to associate with and seal outlets 88 are attached to and capable of being moved vertically by plungers 91 which extend upward through the centers of the tanks and pass out through stuffing boxes 92. Circular openings 93 in the tops of the tanks are provided with caps 94 capable of hermetically sealing said openings. The supply tanks are designed to maintain a constant liquid level in tank 37, two tanks being provided and used alternately to supply latex so that the latex flow and the level of the liquid in tank 37 need not be interrupted or disturbed to allow refilling the supply tanks.

In operation, one of the tanks 38 is filled with latex while the outlet 88 is closed by the plug 90. When filled, the tank is hermetically sealed with cap 94, and plunger 91 with the attached plug 90 raised, opening the outlet 88 and allowing latex to flow into tank 37 in which the liquid level will rise until it reaches the lower extremity of the sleeve 89, but when the opening thereat is sealed by the rising liquid no further flow from the supply tank will occur except that which is necessary to maintain the level of the latex constant as it is removed by the deposition belt 23. The latex level in tank 37 obviously may be regulated and controlled by changing the vertical position of the adjustable sleeve 89.

Baffles 95 are provided in the tank 37 so that turbulence in the latex due to flow of liquid from the supply tank will not be transmitted to the deposition zone.

The depth of latex in the tank 37 may be changed by raising or lowering the entire tank, the liquid level itself remaining constant as determined by the position of the sleeve 89, the necessary change in the vertical position of tank 37 being accomplished by changing the height of the interposed supporting members 85, as by substituting different size members therefor, although mechanical means for elevating the tank may be installed if desired.

Fig. 4 illustrates certain constructional details of the apparatus for supporting and driving the deposition belt 23 which passes over roller 21 at the beginning of the cycle of operations described in connection with Fig. 1 and over similar roller 22 after having traversed the greater part of the cycle and received a coating of rubber latex 46. Said rollers are associated with shafts 96 journalled in supporting frame members 15 and actuated by gears 20 and sprocket and chain 19. Attached to frame 15 is a conditioning chamber 40 enclosing the deposition belt passing over roller 22, through which is circulated vapors conveyed thereto by a circulating system of which the duct 42 is a part.

In Fig. 5 the rubber sheet 46 is pressed and supported between water absorbing belts 56 and 57 which pass between and receive pressure from the parallel rolls 58 and 59, disposed one above the other and associated with shafts 97 journalled in frame members 140 and actuated by gears 98 and 99 which are a part of the gear train 60 of Fig. 1. Adjusting means 61 are provided to regulate the pressure applied by the rolls to the belts.

Fig. 6 illustrates certain details of the mechanism for driving the rolls of Fig. 5. Upper gears 100 engage and rotate upper gears 98 and roll 58 of Fig. 5 and are in turn meshed with and rotated by lower gears 101 which also engage and drive lower gears 99 and roll 59 of Fig. 5. Gears 100 and 101 are associated with shafts 102 and 103 journalled in frame members 140 and rotated by sprocket and chain 142. It is obvious that this arrangement of driving gears allows considerable vertical movement of the rolls 58 and 59 and associated gears 98 and 99 of Fig. 5 without said gears becoming disengaged from driving gears 100 and 101 (Fig. 6). The absorbing belts 56 and 57 carrying the rubber sheet 46 move between the shafts 102 and 103 to the next pair of rollers in the series.

The sheet of rubber 46 from the drying drum 69 (Fig. 1) is directed through a shearing device 71 shown in Fig. 7 consisting of a plurality of circular knives 104 mounted on a freely rotating shaft 105 and associated with a roller 106 having in its surface, a plurality of circumferential grooves in which rotate the knives 104, so that a rubber sheet 46 passing through the device will be longitudinally severed into a plurality of continuous strips which are individually wound into discs 72 on a rotating spindle 73 frictionally driven by means of separable driving connection 143, friction driving mechanism 144 and sprocket and chain 145. The frictional drive allows a certain amount of slippage and thereby effects the necessary change in the wind-up rate as the discs 72 increase in diameter due to the building up of successive layers of rubber thereon. When the discs have been built up to the desired size, they with the supporting spindle 73 may be removed by disengaging the spindle at the separable connection 143 and the bearing 146, and another spindle is then placed therein to receive the rubber. The entire wind-up apparatus is supported by suitable means on upright frame members 13.

An alternative apparatus shown in Fig. 8 for producing film or sheet of latex on a moving surface comprises a table-like supporting structure 110 and mounted thereon and capable of being elevated or lowered by means of two interposed hand-operated screw jacks 111 actuated by a hand crank 112 and associated shaft 113, and vertically directed by sliding guides 114 is a rubber lined rectangular tank 115 adapted to contain latex maintained therein at a constant liquid level by controlled flow from a supply tank 116 similar in construction to the supply tanks 38 hereinabove described, and mounted on and above tank 115 by means of a suitable supporting bracket 141.

The latex tank 115 is provided with a weir or spillway 118 adapted to conduct latex from the tank 115 at a predetermined rate as fixed by the size of the weir and the height of the latex level as determined by the position of the movable sleeve 117 at the lower extremity of the outlet of supply tank 116, and deliver said latex to a fluted or corrugated chute 119 hinged to tank 115 and further supported by an adjustable device 120 associated with a structural steel frame 121. The latex flows down the chute 119 and onto a horizontally moving endless deposition belt 122, which passes under the end of the chute, and is carried by an adjustably mounted roller 123 on frame 121, and which has previously received a coating of a rubber coagulant applied thereto by any suitable means as by spraying or by contacting with a transfer roller 124, rotatably mounted on and dipping into a tank 125 containing a liquid rubber coagulant, and supported by a bracket 126 associated with frame 121, below the deposition belt 122.

The coagulant coated belt 122 with the associated latex sheet travels for a considerable horizontal distance at such a speed as to allow time for the latex carried thereon to be completely coagulated, in the course of which travel, the belt and associated rubber may be directed through conditioning chambers similar in principle to the chamber 40 previously described in connection with Fig. 1.

When coagulated, the sheet of rubber is removed from the deposition belt and subjected to the drying and compacting treatment hereinabove described, namely passing through guide rolls 47 (Fig. 1) into the wringer and thence through the remaining steps of the process substantially as described.

In Fig. 9 are illustrated certain constructional details of the apparatus of Fig. 8 including the latex tank 115 with associated jack supports 111 and guides 114. Centrally disposed near the top of the tank is a weir or spillway 118, leading to the corrugated or fluted chute 119 hinged to the tank by means of suitable hinges 127, and adapted to receive liquid from the spillway and direct it down the chute in a substantially uniform stream across the entire width of the chute.

The corrugations or ridges 128 in the chute may be relatively high so as to cause the latex to flow down the chute in a plurality of separate streams, or they may be lower and/or smaller so as to merely direct the liquid flow without breaking it up into separate streams, and so prevent its collecting or concentrating in a particular area of the chute.

In Fig. 10 is shown a modified form of the chute in which the corrugations 128 are flattened for a short distance at the lower end of the chute to provide an unbroken flat surface 129 on which the latex may spread and the several streams unite to form a single uniform broad stream across the width of the chute before flowing on to the deposition belt.

The method and apparatus of the hereinabove described invention are extremely flexible in their operation and are adapted to permit many changes and variations in conditions governing the process to be made at will, thus providing means for carefully regulating and controlling the rubber manufacture as demanded by variations in uncontrollable factors influencing the process so that a uniform product of the highest quality may result therefrom.

The thickness and properties of the film of wet rubber deposited on the belt of the apparatus may be widely varied by suitably altering factors governing the deposition process, as by varying the amount of coagulant applied to the deposition belt by controlling the concentration of the coagulant solution applied by the transfer roll 33 (Fig. 1), or by changing the level of the latex in the tank 37 in the manner previously described, so that the deposition belt may be caused to merely skim the surface of the latex, or if desired to actually dip into the body of the liquid to receive a coating thereof, or by treating the film with different conditioning vapors in the chamber 40. Likewise, if the tank 37 be elevated or lowered, the actual liquid level therein meanwhile remaining constant as determined by the position of the sleeve on the supply tank outlet, the depth and quantity of latex in the tank 37 may be varied. Obviously, if the deposition occurs from a small quantity of latex, say the amount present when a liquid depth of one-half inch is maintained in the tank, the resulting coagulum will contain substantially all the suspended material in the latex, whereas, if the deposition occurs from a latex bath say six inches deep, the coagulum will contain solids from the supernatant liquid only.

In the alternative apparatus (Fig. 8) the quantity of latex applied to the belt may readily be varied by changing the position of the sleeve 117 on the outlet of tank 116, thereby allowing a greater or lesser volume of latex to flow into and out of the tank 115 onto the chute 119 and thence to the deposition belt. If desired, the rate at which the liquid flows down the chute may be varied by elevating the tank 115 by means of the screw jacks provided, and thereby varying the angle of the chute with the horizontal. Again, the quantity of coagulant applied to the belt may be varied as above explained in connection with Fig. 1.

In either case, dirt and similar material suspended but not dispersed in the latex will settle to the bottom of the deposition tanks and not be incorporated in the rubber as is the case in prior processes.

Although the process has been described as applying coagulant or other conditioning material, both to the belt as a solution, prior to deposition of rubber thereon, and to the subsequently deposited rubber as a vapor, it is obvious that coagulant may be applied at either point only, and that other conditioning materials may be substituted for the coagulant in either or both places. If desired, the vapor conditioning apparatus may be suitably altered and used as a simple dryer.

Any of the commonly used rubber latex coagulants such as formic, acetic, sulfuric, and other acids, or the salts of calcium, magnesium and zinc such as the nitrates, chlorides, etc. are suitable for use in or as the coagulating solution preliminarily applied to the belt. The material used in the subsequent vapor conditioning treatment is necessarily limited to vaporizable substances such as acetic and formic acids, ammonia, etc.

Thus, the deposition apparatus makes possible the continuous formation of a uniform film or sheet of water-containing coagulum, the properties of which may be widely varied at will, yet maintained constant as desired, and the conditions governing the subsequent drying and compacting treatment likewise may be varied as necessity demands, as by changing the pressures applied by the various rolls and the temperature of the drying drums, thereby varying the properties of the finished rubber. By suitably controlling and varying these operating conditions, rubber, for example, of almost any desired degree of softness or plasticity may be produced, and other properties may be similarly varied and controlled at will.

It is believed that if a freshly deposited mass of coagulated rubber is never allowed to recover from the initial deformation given it, as by passing through squeeze rolls, that is if the sheet after leaving the "bite" of the rolls is not permitted to "jerk back" on itself but is maintained in its deformed distended state, that a crude rubber is produced which is more easily worked and handled in the subsequent manufacturing operations to which it is subjected than would be true were the sheet allowed to regain its undeformed condition as is usually the case, and the present invention is adapted to accomplish this effect. The several parts of the apparatus (Fig. 1) may be so speeded and synchronized that after the sheet of wet coagulum is first compacted and distended by the belts 48 and 49 associated with the rolls 50 and 51 comprising the wringer, it will never be allowed to "jerk back" and regain its original undeformed state, but will be maintained throughout the subsequent drying and winding processes in a distended condition and under slight but definite tension.

Further, the fact that the rubber sheet is maintained in a thin distended condition while pressed in contact with the absorptive belt surfaces, and the heated drying drums, serves to accelerate the drying steps and thereby speed up the entire procedure.

Preparing the rubber in the form of discs according to the method of this disclosure is particularly desirable because the discs are of a size made convenient for subsequent wrapping, packing and handling, requiring a minimum amount of protective covering and exposing a minimum of superficial area to surface oxidation and contamination. Further, the discs may be prepared in a size suitable for convenient handling and use in subsequent manufacturing operations, thus eliminating the necessity of preliminary reduction to smaller size before use in a rubber factory as is now necessary.

In brief, the present new method of preparing rubber is continuous and faster than the inherently slow intermittent process now practiced on plantations, thereby reducing the time required to produce dried rubber from liquid latex from one to two weeks, to a matter of minutes, and by furnishing means for scientifically controlling and correlating the conditions governing every operation comprising the process, makes possible the production of a more uniform rubber of higher quality and possessing new and valuable properties, not exhibited by prior rubbers.

The generic term "rubber" as employed in the specification and claims of the present invention should be construed in its broader sense to include caoutchouc, balata, gutta percha, and similar gums, and likewise "latex" should include flowable dispersions of such materials, whether in the natural, vulcanized or reclaimed condition and whether compounded or uncompounded.

I claim:

1. The method of preparing rubber from latex which comprises forming a continuous length of latex, and then gradually effecting a substantially uninterrupted syneresis of the rubber of the latex by treating said latex with a coagulant, then pressing the coagulated rubber between water-absorptive surfaces, and lastly heating said rubber, the successive syneresis-effecting operations being performed without substantial intervening elapse of time.

2. The continuous method for preparing rubber from latex which comprises forming a sheet of rubber coagulum, distending said sheet, drying the sheet in its distended condition and subsequently consolidating the dried distended sheet into a compact form without at any time relieving the tension on the sheet.

3. Apparatus for preparing rubber from latex which comprises means for continuously forming a continuous length of latex, and means for effecting a gradual and substantially uninterrupted syneresis of the rubber of said latex which comprises means for treating said length with a coagulant, means for pressing said length between water-absorptive surfaces, and means for heating said length, said means being arranged to operate successively upon the latex without substantial intervening elapse of time.

4. Apparatus for continuously preparing rubber from latex which comprises means for continuously forming a sheet of rubber coagulum from the latex, means for treating said sheet with conditioning vapors, and means for drying and compacting said sheet into a unitary mass, said means being arranged to operate in succession upon the latex sheet without substantial intervening elapse of time.

5. Apparatus for continuously preparing rubber from latex which comprises means for continuously forming a sheet of rubber coagulum from the latex, means for distending said sheet, and means for drying said sheet while distended.

6. Apparatus for continuously preparing rubber from latex which comprises a continuously moving surface with means for cleaning said surface, means for applying coagulant thereto, means for superimposing thereon a coating of the latex and means for treating the latex with conditioning vapors, with means for removing the resultant sheet of rubber from the moving surface and means for drying said sheet.

7. Apparatus for preparing rubber from latex which comprises means for producing continuously a sheet of water-containing latex, and means for continuously removing water from said latex sheet, said means comprising a pair of water-absorptive endless belts disposed with a considerable portion of their areas in contiguous relation, means for moving said belts so that the contiguous portions travel at substantially the same speed and in the same direction, means pressing said contiguous portions toward each other, and means for directing the latex sheet between the contiguous faces of the belts in timed relation with the travel of the belts.

8. Apparatus for preparing rubber which comprises means for producing continuously a sheet of water-containing latex, and means for continuously preliminarily removing a substantial part of the water from the latex sheet which means comprises a pair of endless belts moving in timed relation and making substantial line contact with means for directing the latex sheet between the belts at the line contact in timed relation with the travel of the belts, and means for further removing water from the latex sheet which comprises a second pair of water-pervious endless belts disposed with a considerable portion of their areas in contiguous relation, means for moving said belts so that the contiguous portions travel at substantially the same speed and in the same direction and in timed relation with the travel of the first pair of belts, means pressing said contiguous portions toward each other, and means for directing the latex sheet between the contiguous faces of the belts in timed relation with the travel of the belts.

9. Apparatus for preparing rubber from latex which comprises means for forming from the latex a continuous strip of rubber coagulum, and means for effecting a gradual and substantially uninterrupted progressive syneresis of the rubber of said coagulum which comprises successive means for treating said strip with a coagulant, means for expressing water from said strip, and means for heating said strip, said successive means being arranged to operate upon the strip of coagulum without substantial intervening elapse of time.

10. Apparatus for preparing rubber from latex which comprises means for forming from the latex a strip of water-containing rubber coagulum, a water-absorptive belt for carrying the strip of water-containing coagulum, and means for kneading the coagulum while it is in contact with the water-absorptive belt.

11. Apparatus for preparing rubber from latex which comprises means for forming from the latex a strip of water-containing rubber coagulum, a water-absorptive belt for carrying the strip, a pair of closely-relationed positively driven pressure rollers having their axes in parallel alignment, and means for directing the water-absorptive belt and strip of rubber coagulum between said pressure rollers.

12. Apparatus for preparing rubber from latex which comprises means for forming from the latex a strip of water-containing rubber coagulum, means for tensioning said strip, and means for removing water from said strip while it is held in its tensioned condition.

13. The method for preparing rubber from latex which comprises forming from the latex a strip of water-containing rubber coagulum, tensioning the strip, and removing water from the strip while it is held in the tensioned condition.

14. The method for preparing rubber from latex which comprises forming from the latex a strip of water-containing rubber coagulum, and kneading said coagulum while it is in contact with water-absorptive material.

15. The method for preparing rubber from latex which comprises forming from the latex a continuous strip of water-containing rubber coagulum, and effecting a gradual and substantially uninterrupted syneresis of the rubber of said strip of coagulum by successively treating said strip with coagulant, expressing water from the coagulant-treated strip and heating said strip, the successive syneresis-effecting operations being performed without substantial intervening elapse of time.

MARION A. CHEEK.